Sept. 6, 1966  L. W. POLLOCK  3,271,185
POLYMER STABILIZATION
Filed Aug. 1, 1963

INVENTOR.
L. W. POLLOCK
BY Young & Quigg
ATTORNEYS

United States Patent Office 3,271,185
Patented Sept. 6, 1966

3,271,185
POLYMER STABILIZATION
Lyle W. Pollock, Bartlesville, Okla., assignor to Phillips Petroleum Company, a corporation of Delaware
Filed Aug. 1, 1963, Ser. No. 299,225
7 Claims. (Cl. 117—100)

This invention relates to a method for stabilizing polymeric compounds. In one aspect, this invention relates to a novel method for uniformly distributing antioxidant compounds on polymeric compounds. In another aspect, this invention relates to a method for providing more stable polymeric compositions by providing a more uniform coating of the antioxidant on the polymers than has heretofore been achieved.

Recently, considerable attention has been directed to the production of solid polymers, e.g. polymers of ethylene and/or propylene and the like. The solid polymers and copolymers so produced have utility in applications wherein solid plastics are used. For example, they can be extruded to form filaments and film, or they can be molded to form articles of any desired shape, such as bottles, containers, pipe, and the like. The normally solid polymers are affected to a greater or less extent by the action of oxygen when exposed thereto in the presence of light and/or heat. One of the methods most commonly employed to prevent or inhibit such oxidation has been the incorporation of various antioxidants into the polymer. Generally, only small amounts of the stabilizer(s), e.g. 0.03 weight percent, are necessary to obtain the desired antioxidative effect. In the past, difficulty has sometimes been experienced in controlling the addition of the stabilizer so as to obtain a product of uniform composition, particularly when the polymer is produced in a continuous process. By proceeding in accordance with the instant invention, it is possible to obtain a polymer product containing a uniform amount of an antioxidation agent.

It is an object of this invention to provide a method for stabilizing normally solid polymers.

Another object of the invention is to provide a method for obtaining a polymer product containing a uniform amount of antioxidation agent.

Other objects, advantages and features of the invention will become apparent to those skilled in the art upon consideration of the accompanying disclosure, drawings and appended claims.

I have now discovered in accordance with this invention that a uniform distribution of antioxidant can be obtained by a vapor condensation addition of the antioxidant onto the polymer. By saturating a carrier gas with vaporized antioxidant and contacting the solid polymer therewith, there is achieved a uniform dispersion of the antioxidant material onto the polymer.

The invention is broadly applicable to controlling the addition of stabilizers, such as alkyl-substituted phenols, to normally solid particles. While the invention is especially applicable to the stabilization of polymer particles, the process of this invention can be employed in the application of a coating to any solid material. These polymer particles can be prepared by the polymerization of 1-olefins having up to and including 8 carbon atoms per molecule. The polymerization product can be a solid homopolymer or a copolymer, or a mixture thereof. Examples of 1-olefin hydrocarbons which can be employed in the preparation of the polymer particles are ethylene, propylene, 1-butene, 1-hexene, and 1-octene. Branched chain olefins also can be used, such as isobutylene. Also 1,1-dialkyl-substituted ethylene can be employed. Examples of the di- and polyolefins in which the double bonds are in nonconjugated positions and which can be employed in the preparation of the polymer particles are 1,5-hexadiene, 1,4-pentadiene and 1,4,7-octatriene. Cyclic olefins also can be employed, such as cyclohexene. These polymers can be prepared by any known procedure including vis-breaking of original polymers. The polymerization can be effected at a temperature in the range of 150 to 450° F. The pressure can range from approximately atmospheric to as high as 1000 p.s.i.

The antioxidation agents to which the invention is applicable are selected from the group consisting of alkyl-substituted phenols having not more than 16 carbon atoms, arylamines, aryl phosphites, alkaryl phosphites, saturated aliphatic amines, saturated cyclic amines, amino oxides, amino alcohols, cyclic alcohols, alkyl sulfides, phosphite esters and the like. Such agents include dilauryl thiodipropionate, 2,6 - ditertiarybutyl - 4 - methylphenol, 2,6 - ditertiarybutylparacresol, 2,2' - thiobis - 4-methyl-6-tert-butylphenol, diisopropanolamine, cyclohexyl-cyclohexanol, triphenyl phosphite, tributyl phosphite and the like. An antioxidation agent can be deposited on a solid in accordance with the invention, which is limited only by the requirement that the agent be capable of being vaporized without substantial decomposition, with the aid of a carrier gas, if desired. The preferred group of antioxidation agents particularly for use in coating olefin polymers are those which desublimate on contact with the polymer. Such compounds include, among others, 2,6-ditertiarybutyl-4-methylphenol.

A more complete understanding of the invention can be obtained by referring to the drawings, in which.

The invention will hereinafter be described as it is applied to the coating of polymer particles with an antioxidant material, although it is not intended that the invention be limited thereto.

Figures 1, 3:
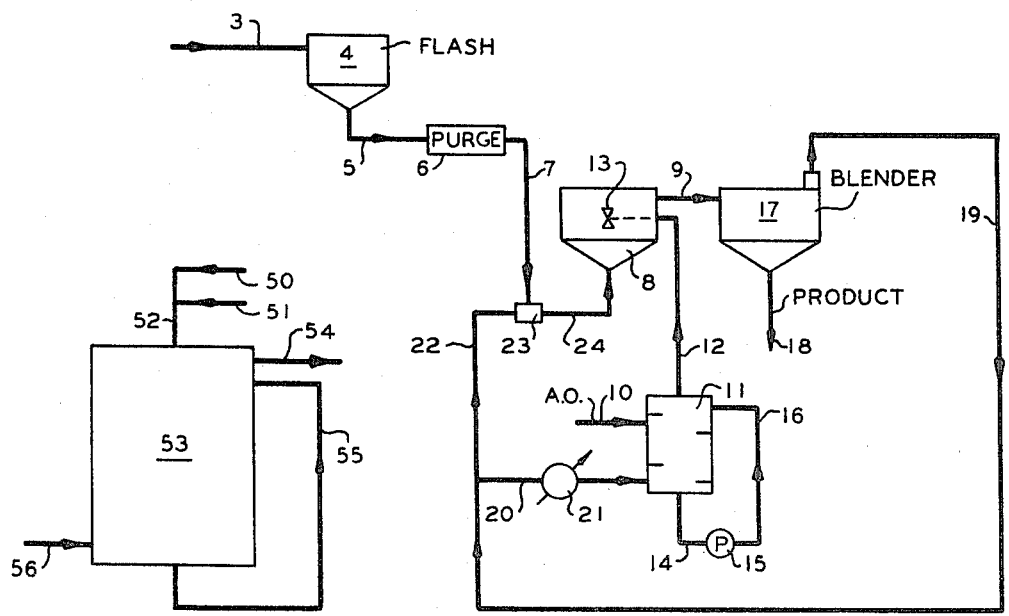
FIGURE 1 is a schematic view of the addition process of the invention wherein the antioxidant is added in a fluidized bed to the polymer.
FIGURE 3 is a schematic view of a process whereby two antioxidants are added to the polymer.

As shown in FIGURE 1, a mixture of a polymer compound, unreacted monomers and diluent are passed to flash zone 4 by means of conduit 3 wherein the unreacted monomers and diluent are removed for recycle or other use. The thus formed polymer particles free of unreacted monomers and diluent liquid are then conveyed via conduit 5, purged in conveyor 6 and passed via conduit 7 to fluidizing junction 23 wherein circulating gas from conduit 22 disperses and transports the polymer particles via conduit 24 to fluid bed 8. The particular antioxidant to be coated onto the polymer particles is introduced periodically or continuously via conduit 10 to vaporizing chamber 11 wherein the antioxidant is vaporized and mixed by and with a carrier gas, such as inert gas, and fed by means of line 12 to injection nozzle 13 in the fluidized bed 8. Vaporizer 11 is adapted by means of conduits 14 and 16 and pump 15 so as to provide adequate circulation and mixing of the hot carrier gas, via conduit 20 and heater 21, and the antioxidant. The vaporized antioxidant and carrier gas are introduced into fluidized bed 8 containing the polymer particles to be coated at a rate sufficient to impart to the polymer particles the desired antioxidant coating. The resulting coated polymer particles are then passed via conduit 9 to blender 17 wherein separation from the fluidizing gas takes place and wherein additional polymer particles may be mixed and intimately blended therewith. The resulting antioxidant-treated, blended polymer is then removed for subsequent use through conduit 18. Conduit 19 is so adapted as to provide recycle of the carrier gas either back to the vaporizer 11 via conduit 20 and preheater 21 or to the fluidized bed 8 via conduit 22, junction 23 and conduit 24.

Figure 2:
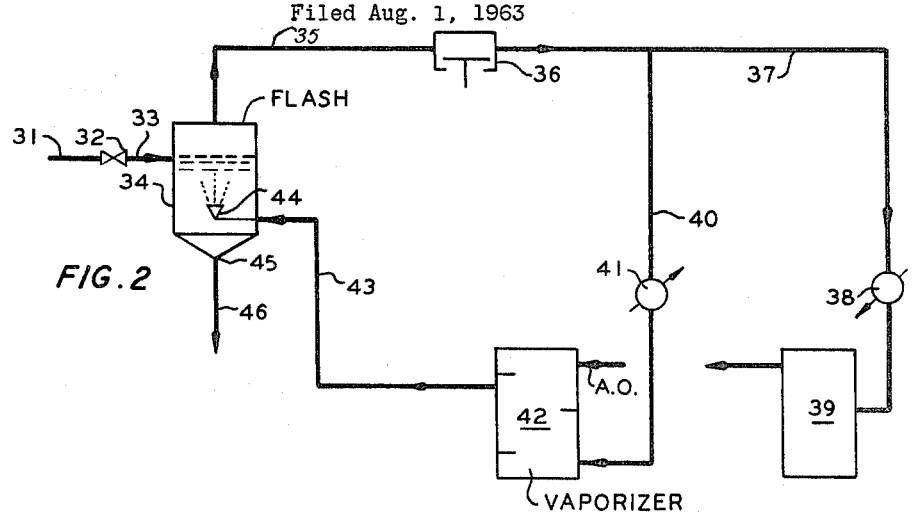
FIGURE 2 is a schematic view of the addition process of the invention wherein the antioxidant is added in the flash chamber wherein particulate polymer is separated from the diluent in which it is formed.

As shown in FIGURE 2, a slurry of polymer in diluent as formed in a polymerization reactor passes via conduit 31, pressure let down valves 32, and conduit 33 into flash tank 34 wherein the pressure is sufficiently low to flash-vaporize most of the diluent which passes overhead through conduit 35 to compressor 36 where as illustrated it may then be passed by way of conduit 37, condenser-cooler 38 and recycle purification system 39 as recycle back to the reactor, or all or a portion of same can be passed by means of conduit 40 and heater 41 to vaporizer 42 wherein it can serve as the carrier gas medium for the vaporized antioxidant. The vaporized antioxidant and carrier gas are introduced by means of conduit 43 and nozzle 44 into flash tank 34. The polymer therein being at a temperature lower than that of the antioxidant-gas mixture and in a state of turbulence readily causes condensation of the antioxidant onto the polymer particles. The rate of introduction of the antioxidant is controlled so as to obtain the desired coating of the polymer particles. Coated polymer is then removed through valve 45 and conduit 46.

Figure 4:
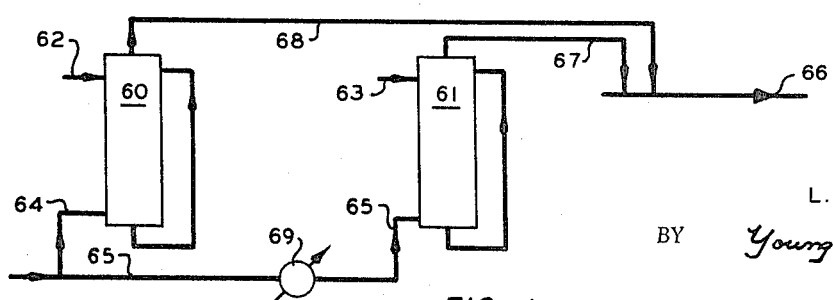
FIGURE 4 is a schematic view of an alternative system for adding more than one coating material to the polymer.

FIGURES 3 and 4 illustrate embodiments of the present invention wherein a multicomponent antioxidant-stabilizer is utilized for coating the polymeric material. As shown in FIGURE 3, conduits 50 and 51 each communicate with a separate source of stabilizing materials, not shown, and conduit 52 so as to introduce a mixture of the desired materials to saturator 53. The carrier gas thus saturated with the mixture of antioxidants can then be utilized in either the fluidized bed coating process as disclosed in FIGURE 1 or in the flash-coating operation as disclosed in FIGURE 2 by means of conduit 54. The saturator 53 is similarly provided with recycle conduit 55 and carrier gas inlet 56.

As an alternative to the system of FIGURE 3 for multicomponent agents, two or more saturators such as 60 and 61 are employed to handle the multicomponent antioxidant-stabilizer. In this case, each of the components is introduced separately to the vaporizers 60 and 61 via conduits 62 and 63. Carrier gas is introduced via conduits 64 and 65. As shown, additional heat may be supplied to the carrier gas in line 65 by supplementary heater 69 to make allowance for stabilizers exhibiting different vapor pressures and to provide for control of stabilizer addition rates. The vaporized streams are then combined in conduit 66 by means of conduits 67 and 68 and thereafter introduced into the fluidized contactor, or if desired, introduced to the turbulent polymer particle bed by separate addition nozzles.

The following examples will serve further to illustrate the invention.

*Example I*

One hundred pounds per hour of polymer fluff (polymer precipitated from solvent and recovered after removal of solvent in the presence of steam) obtained by polymerization of ethylene and 1-butene by a chromium oxide on silica-alumina catalyst system in pentane diluent is passed to a flash vessel 4 in which, by virtue of reduced pressure, the remaining monomer and diluent are flash-vaporized. Pentane vapor remaining with the polymer is removed by sweeping with inert gas in purge-conveyor 6, which may also act as a polymer feeding device. About 100 pounds per hour of the dry, purged polymer particles are fed into a stream of inert gas such as nitrogen, circulating at a rate of about 200 standard cubic feet per hour, this stream containing a small concentration (0.006 pounds per 200 c.f.) of a vaporized antioxidant such as 2,6-ditertiary-butyl-4-methylphenol at about 120° F. and about 10 p.s.i.g., the polymer being fluidized-transported into fluid bed contactor 8. Inert gas at a rate of about 12.5 standard cubic feet per hour is heated to about 260° F. in heater 21 and is passed to saturator 11 where it vaporizes and transports about 0.066 pound per hour of antioxidant to the fluid bed contactor 8, wherein by virtue of the temperature difference and the inherent uniformity of fluid bed processes, this amount of antioxidant deposits uniformly on the polymer particles, the conditions therein being about 130° F. and 5 p.s.i.g. The fluidized polymer particles and carrier gas pass to blender 17 wherein phase separation takes place, and additional particulate blending induced by auger or gas lift methods may be practiced if desired. The antioxidant-coated polymer particles are withdrawn via line 18 and the separated gas carrying a small concentration of antioxidant is recirculated by a blower, not shown.

*Example II*

One hundred pounds per hour of polymer fluff (polymer precipitated from solvent and recovered after removal of solvent in the presence of steam), obtained by polymerization of propylene by an organometallic catalyst system comprising the reaction product formed by commingling titanium trichloride and diethylaluminum chloride, after being treated for removal of catalyst residues, are passed as a propylene-wetted, solid polymer particle slurry of about 50 weight per polymer via conduit 31, valve 32 and conduit 33 into flash vessel 34 of FIGURE 2. Within flash vessel 34, conditions of 110° F. and 15 p.s.i.g. exist, under which the liquid propylene associated with the solid particulate polypropylene flash vaporizes, producing a dried polymer fluff. Employing the FIGURE 4 modification of antioxidant vaporizer 42 of FIGURE 2 for the purpose of adding both 2,6-ditertiarybutyl-4-methylphenol and dilauryl thiodipropionate to the finely divided polymer, 20 standard cubic feet per hour of propylene vapor heated to 250° F. at 20 p.s.i.g. by heater 41 vaporizes about 0.071 pound per hour of the phenol in vaporizer 60 and transports it to vessel 34 via conduits 68 and 66. Similarly, 68 standard cubic feet per hour of propylene vapor at 250° F. and 20 p.s.i.g. vaporizes about 0.05 pound per hour of the thiodipropionate in vaporizer 61, transporting it to vessel 34 via conduits 67 and 66.

As in Example I, both stabilizers deposit uniformly on the polymer particles in the desired concentrations of about 0.05 pound of the phenol and about 0.04 pound of the thiodipropionate per 100 pounds of the polypropylene. The residual amounts of the stabilizers not deposited on the polymer pass from the system in the propylene vapor, conduit 37, and are removed from the recycle propylene by recycle purification system 39.

In carrying out the process of the present invention, conditions are so maintained in the fluidized zones that the vaporized antioxidant or mixtures of antioxidants are added in an amount sufficient to impart a coating within the range of 0.01 to 0.20 weight percent based on the amount of polymer being coated. The achieve this desired coating the fluidized zone is maintained at a pressure within the range of 0 to 40 p.s.i.a. The pressure within the antioxidant vaporizer is maintained above that of the fluidized coating zone so as to achieve flow of the vapor to the coating zone. Generally, the temperature of the fluidized coating zone is 80 to 150° F. The temperature of the vaporization zone and resulting vapor added to the coating zone is dependent on the particular antioxidant being employed and the amount of carrier gas being circulated in the system. Generally, a temperature in the range of 175 to 325° F. is employed. It is to be understood that any of the variables occurring in the system can be adjusted so as to achieve the desired vapor phase coating of polymeric particles in a fluidized zone so as to obtain a uniform coating of the particles.

Reasonable variations and modifications of the invention will be apparent to those skilled in the art, and the illustrative details disclosed are not to be construed as unnecessarily limiting the invention.

I claim:

1. In a process for the production of stabilized solid polymer particles wherein said polymer particles are obtained by flash vaporization in a flash zone of a stream containing polymer in a vaporized liquid diluent and removing the resulting vaporized diluent therefrom as effluent, the improvement which comprises uniformly coating the resulting solid polymer particles in said flash zone with an organic antioxidant for said polymer by contacting said polymer particles with a stream comprising vapors of said antioxidant composition and a portion of said vaporized diluent as carrier for the vaporized antioxidant composition.

2. A process according to claim 1 wherein said solid polymer is polypropylene.

3. A process according to claim 1 wherein said solid polymer is the copolymer of ethylene and 1-butene.

4. A process according to claim 1 wherein said antioxidant is 2,6-ditertiarylbutyl-4-methyl phenol.

5. A process according to claim 1 wherein said antioxidant is a mixture of 2,6-ditertiarybutyl-4-methyl phenol and dilaurylthiodipropionate.

6. A process according to claim 1 wherein the solid polymer particles are coated in a fluidized bed.

7. A process according to claim 1 wherein the solid polymer particles are coated in said flash zone.

References Cited by the Examiner

UNITED STATES PATENTS

| | | |
|---|---|---|
| 2,414,625 | 1/1947 | Abrams et al. |
| 2,600,253 | 6/1952 | Lutz. |
| 2,743,196 | 4/1956 | Robinson _____ 117—227 |
| 2,876,133 | 3/1959 | Iler et al. _____ 117—106 X |
| 2,972,597 | 2/1961 | Newland et al. ____ 260—45.85 |
| 2,985,617 | 5/1961 | Salyer et al. _____ 260—45.95 X |
| 3,029,224 | 4/1962 | Fischer et al. ____ 260—45.95 X |
| 3,069,369 | 12/1962 | Galbraith et al. __ 260—45.95 X |
| 3,080,338 | 3/1963 | Nudenberg et al. _ 260—45.95 X |
| 3,085,905 | 4/1963 | Prevot et al. _____ 117—106 |
| 3,117,104 | 1/1964 | Bown et al. _____ 260—45.85 X |
| 3,136,603 | 6/1964 | Klein et al. _____ 117—100 |
| 3,157,532 | 11/1964 | Galmichi. |
| 3,175,922 | 3/1965 | Blocher et al. _____ 117—106 |
| 3,178,308 | 4/1965 | Oxley et al. _____ 117—106 |

FOREIGN PATENTS

| | | |
|---|---|---|
| 627,933 | 7/1961 | Canada. |
| 638,674 | 3/1962 | Canada. |

OTHER REFERENCES

Journal of the Electrochemical Society, October 1951, pp. 385 to 387.

WILLIAM D. MARTIN, *Primary Examiner.*

G. L. HUBBARD, R. HUSACK, *Assistant Examiners.*